United States Patent [19]

Petursson

[11] 4,241,749

[45] Dec. 30, 1980

[54] PRESSURE COMPENSATING VALVE

[76] Inventor: Sigurdur G. Petursson, 2169 Linby St., Mississauga, Canada

[21] Appl. No.: 877,012

[22] Filed: Feb. 13, 1978

[51] Int. Cl.³ .......................................... G05D 11/03
[52] U.S. Cl. .................................................. 137/100
[58] Field of Search ................. 137/100, 98, 115, 116, 137/117, 118

[56] References Cited

U.S. PATENT DOCUMENTS

| 962,111 | 6/1910 | Assmann | 137/100 |
|---|---|---|---|
| 1,538,427 | 5/1925 | Earl | 137/100 |
| 2,313,797 | 3/1943 | Bailey | 137/100 |
| 2,983,279 | 5/1961 | Biermann | 137/100 |
| 3,148,364 | 9/1964 | Engels et al. | 137/118 |
| 3,403,601 | 10/1968 | Eddy | 137/117 |
| 3,456,670 | 7/1969 | Bowman | 137/100 |
| 3,606,904 | 9/1971 | Taylor | 137/115 |
| 3,687,153 | 8/1972 | Gold | 137/115 |
| 3,724,480 | 4/1973 | Povalski et al. | 137/98 |
| 3,742,970 | 7/1973 | Gross | 137/100 |
| 4,094,333 | 6/1978 | Petursson | 137/100 |

FOREIGN PATENT DOCUMENTS 1431360 10/1973 United Kingdom ..................... 137/100

Primary Examiner—William R. Cline
Assistant Examiner—H. Jay Spiegel
Attorney, Agent, or Firm—D. Eggims

[57] ABSTRACT

A pressure compensating mixing valve incorporating a flow control spool has an equalizing passage interconnecting opposite end zones of the spool, to reduce or obviate the need for connecting the respective end portions of the spool to pressure fluid supplies, such as the respective valve outputs. This reduces the significance of spool seals, owing to equalization of pressure between certain pressurized zones, so that seal leakage is of lessened adverse significance. Also valve malfunction due to silting-up or liming-up is made less probable.

2 Claims, 8 Drawing Figures

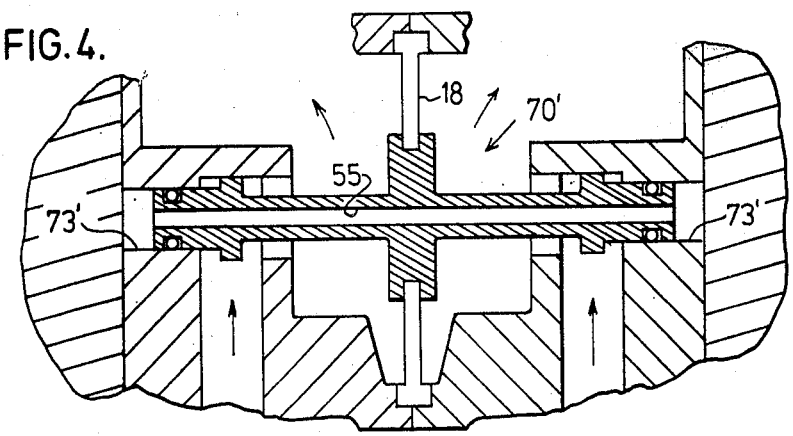
FIG. 4.
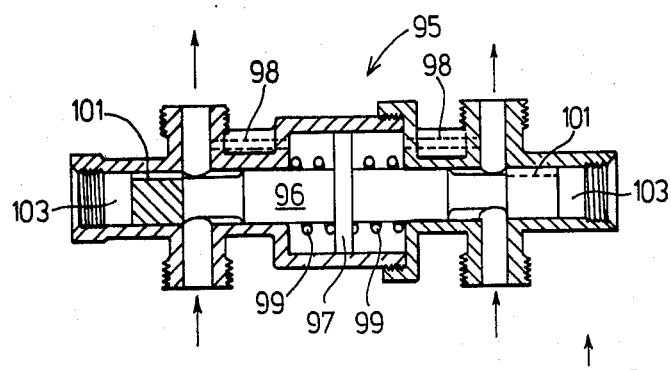
FIG. 7.
PRIOR ART.
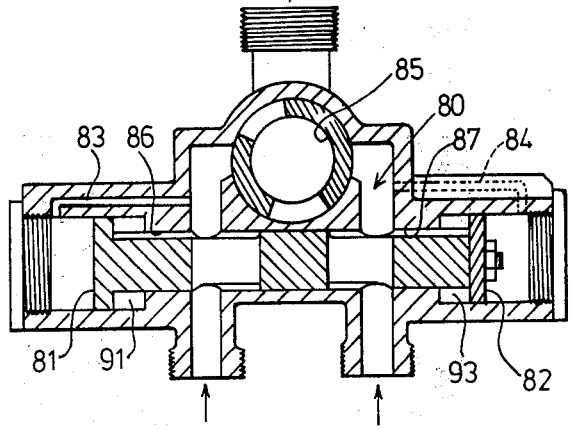
FIG. 5.
PRIOR ART.
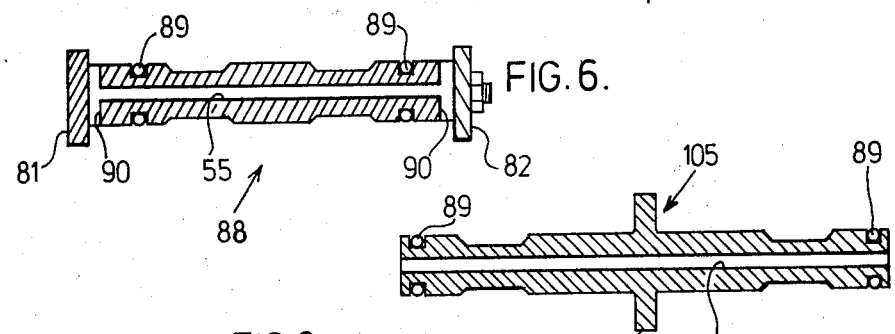
FIG. 6.
FIG. 8.

PRESSURE COMPENSATING VALVE

This invention is directed to a pressure compensating valve of the sliding spool type, and in particular to valves having shrouded spool ends.

In the provision of pressure compensating valves employing a diaphragm in position-controlling cooperation with a spool valve it is often necessary to shroud both ends of the valve from the primary pressure of the incoming pressure fluids or fluid to which the spool is subjected.

There are many such valves in the prior art, certain of which are specifically referred to below. In all instances wherein the shrouded spool construction is used it will be understood that provision for displacement fluid relative to any chamber or shroud space enclosed by the sealed-off spool ends must be made in order to permit free motion of the spool, and to avoid hydraulic lock conditions. Such access for pressure fluid is generally provided to the chambers on shroud spaces into which the spool ends are sealed by way of bleed passages or orifices normally connected to low pressure zones within the valve, such as the outlet plenums or their equivalent, operating at reduced fluid pressures.

The specific disadvantages which arise from such prior art arrangements stem from the susceptibility to blockage of such pressure connecting or bleed passages and orifices, due to the inherent pumping action that occurs when the valve spool is displaced in normal pressure regulating action, also due to a heavy dependence upon the sealing effectiveness of the valve spool in relation to the shroud housing. In the event of failure of a spool seal at one end of the spool with the consequent ingress of high pressure fluid into the respective shroud space, the spool becomes heavily biassed in the opposite direction, under the influence of the leaking primary pressure fluid, so that valve malfunction is inevitable due to the inaccurate imbalance created. Similarly, in the case when partial or complete blockage occurs of a bleed passage or orifice, the ensuing hydraulic lock of the respective shroud space again precludes proper functioning of the valve, thus destroying its sensitivity and response to variations in primary pressure.

Furthermore, valves according to the prior art are subject to liming contamination, with consequent restriction to spool motion.

Relating the above particulars to certain valves of the prior art, U.S. Pat. No. 962,111 Assmann, June 21, 1910 shows a spool valve of the subject type, having chambers or shroud spaces associated with a piston 'f' which are connected by respective bleed passages with the secondary discharge side of the valve.

In the case of U.S. Pat. No, 3,724,480 Povalski et al, Apr. 3, 1973 a valve having a spool 19 is provided with end chambers or shroud spaces 24,26 served by bleed passages 28. In a further prior art embodiment the respective shroud spaces are each connected with the corresponding secondary or outlet pressure zone by way of a respective axial passage through a portion of the length of the valve spool, with transverse passages connecting the respective axial passage to the related secondary pressure zone.

If any of the bleed holes or passages of the prior art become blocked the valves become potentially hazardous, as they can no longer be effective as a mixing valve to control the output temperature, through the function of pressure balancing. Liming-up of the spool bore also produces the tendency to malfunction.

In accordance with the present invention there is provided a balancing spool valve having opposed end portions received in sealing relation in respective end shroud means, to enclose shroud spaces therein and a balance passage extending longitudinally through the spool to connect together the shroud spaces in pressure equalizing relation by the transfer of fluid in balancing relation therebetween, to permit longitudinal displacement of the spool from an intermediate position, with commensurate respective increase and corresponding decrease in the volume contained in the respective shroud spaces, while maintaining unvaried the total volume of the shroud spaces and the balance passage associated with the valve spool.

Certain advantages accruing to the presently disclosed construction include the fact that slight leakage between spool end and its associated shroud space will not of necessity incapacitate the valve because such leakage balance passage and shroud spaces will all fill with fluid at substantially primary pressure thereby remaining in a balanced condition. The pressure drop applied across the corresponding intact seal of the spool other end comprises the difference in pressure between the two primary pressures, which difference generally is of a low order, so that the pressure load on the remaining spool seal is of such a low order to be unlikely to lead to early seal failure. Accordingly, the valve is generally capable of maintaining its function, because any displacement of the spool by the pressure balancing means such as the diaphragm in performing its normal regulatory function produces diminution of one shroud space with a corresponding increase in the shroud space of the opposed end, and the generally unrestricted displacement of the transferred volume of fluid through the longitudinal spool balance passage. Minor failure of both of the spool seals permitting primary leakage of both sides would generally still permit effective operation of the valve, with no major malfunction or danger. Furthermore, the substantial isolation of the spool chambers from the actuating fluid precludes precipitation, hydraulic locking and affords improved spool balance characteristics.

The construction herein disclosed provides significant improved reliability of function under adverse circumstances, to permit operation even while handling fluids containing sediment, scale and impurities to a normally unacceptable extent.

Furthermore the subject arrangement is particularly susceptible of low cost manufacture and obviates certain higher production costs associated with manufacture of the noted prior art embodiments.

Certain embodiments of the present invention are described, reference being made to the accompanying drawings, wherein;

FIG. 4 is a view corresponding to FIG. 3 of a second embodiment of the present invention;

FIG. 5 is a partial view in diametrical section of a third spool valve according to the prior art;

FIG. 6 is a spool for the FIG. 5 valve modified in accordance with the present invention;

FIG. 7 is a view in diametrical section of a fourth spool valve according to the prior art; and FIG. 8 is a spool for the FIG. 7 valve in accordance with the present invention.

Figure 1:
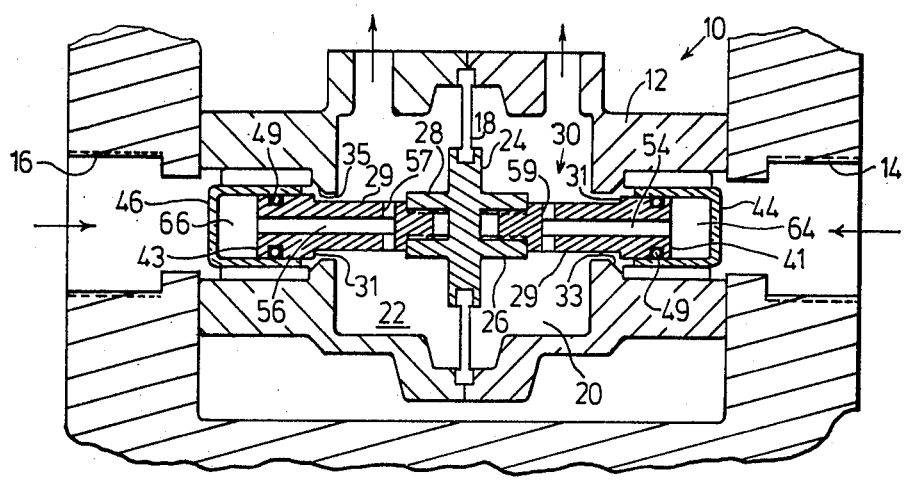
FIG. 1 is a diametrical cross-section of a first spool valve according to the prior art.

Referring first to FIG. 1, which comprises a section view of a spool valve presently on the market, the valve 10 has a body 12 having opposed inlets 14 16 therein.

A circular shaped diaphragm 18 divides the interior of valve 10 into chambers 21 22.

A central boss 24 carried by diaphragm 18 has a pair of oppositely extending threaded sockets 26, 28 which each receive a portion 29 of a valve spool 30. The enlarged head portions 31 of spool 30 cooperate with valve seats 33, 35 to regulate by throttling the inflow of liquid through inlets 14,16.

The pressure drop created by liquid flowing past the seats 33,35 produces lower, secondary pressures in respective chambers 20,22 acting on opposite sides of the diaphragm 18. The outer end faces 41,43 of the spool 30 are contained within isolating chambers 44,46 so that inflowing liquid may not act thereagainst. Seals comprising O-ring seals 49 ensure that liquid at secondary pressure only is admitted internally to the isolating chambers 44, 46 only by way of passages 54, 56 and cross passages 57,59. It will be evident that in operation a change in pressure at one of the inlets causing a related change in the secondary pressure in chambers 20,22 will lead to regulatory displacement of the diaphragm 18. This diaphragmic displacement will reposition the two spool halves 29 both in regard to their seats 33,35 to effect pressure regulation; and with respect to their isolating chambers 44,46. These latter motions will cause either an induction or a pumping out of liquid from the respective internal volumes 64,66 of the end chambers 44,46.

In water or other liquid being received into the valve 10 which contains sediments or scale such pumping action by the valve spool generally ultimately leads to a gradual blockage of the passages 54,56,57,59 and possible filling up or at least fouling of chamber volumes 64,66 until effective motion of the valve spool 30 is precluded.

Figure 2:
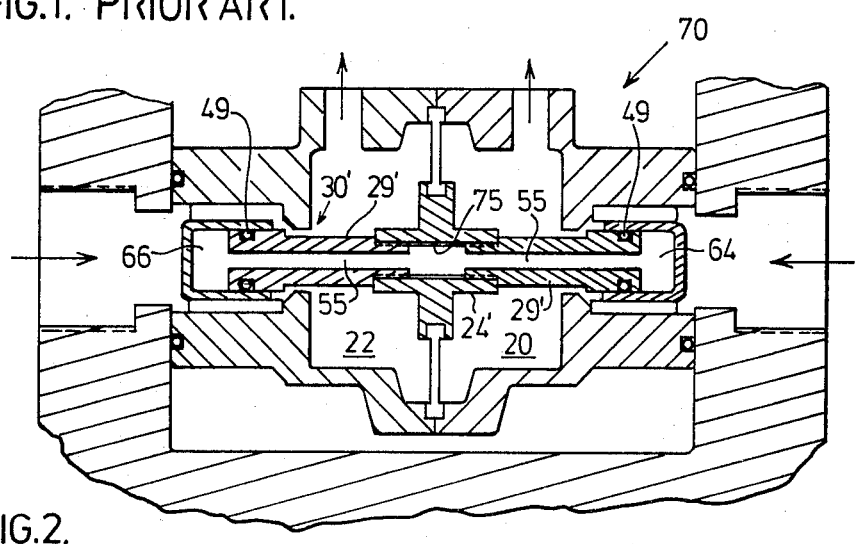
FIG. 2 is a corresponding view of a valve similar to that of FIG. 1 but incorporating the present invention as a first embodiment.

Referring to the valve 70 illustrated in FIG. 2, comprising one of the embodiments of the present invention, this valve 70 has generally the same structure and function as valve 10 of FIG. 1. However, both halves 29' of the spool 30' have a single bore 55 communicating exclusively through bore 75 in the boss 24', to provide unrestricted fluid interchange between end chambers 64,66.

In operation it is normally intended that the sealed interior space comprising end spaces 64,66 and the communicating passage therebetween shall be air filled. However, a suitable liquid such as water or an acceptable lubricant such as water soluble oil which does not adversely affect the seal O-rings 49 may be used.

In operation, over a period of time it is to be expected that the O-ring seals will ultimately admit to the sealed spaces 64,66 the fluid passing through the valve. However, it will be appreciated that in operation the pumping action operating on the spool 30' serves only to transfer air or any other fluid trapped within the spool interior space from one end of the spool 30' to the other end. There is effectively no induction or fouling of the valve, with consequent hydraulic lock or other malfunction such as imbalance virtually precluded.

Figure 3:
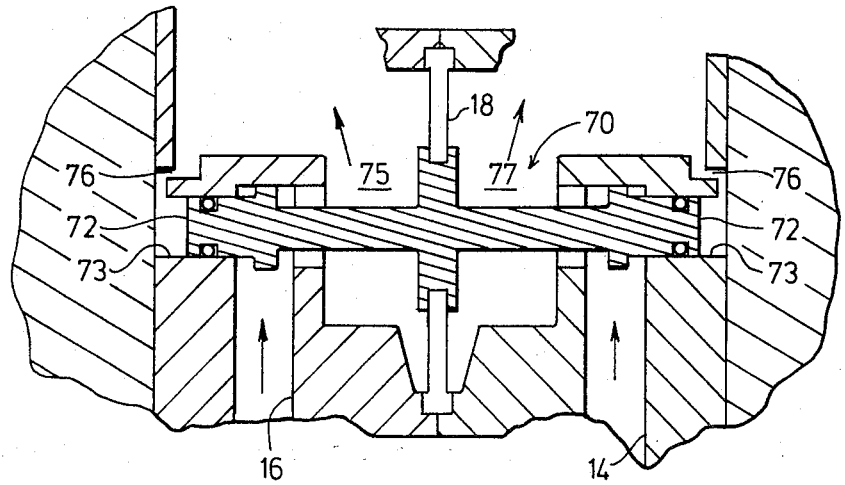
FIG. 3 is a spool valve according to prior art.

Turning to FIG. 3, prior art embodiment, in this second embodiment an annular diaphragm 18 supports a spool 70 at its central annular boss 71. The outer ends 72 are sealed within housing bores 73.

Primary inlets 14,16 admit incoming fluid to the valve, being throttled in passing past spool 70 to the secondary zones 75,77 of the valve. Restricted bleed passages 76 admit secondary fluid to the respective housing bores 73. In the corresponding embodiment according to the present invention, shown in FIG. 4, the bleed passages are dispensed with, and the sealed housing bores 73' are interconnected in free fluid transfer relation by the provision of bore 55 extending throughout the length of spool 70'.

Turning to the FIG. 5 prior art arrangement, this varies slightly from FIG. 3 in that the spool 80 is slideably supported at its centre portion, having enlarged heads 81,82 to which secondary or outlet pressures are admitted to both sides of each head by way of bleed passages 83,84,86 and 87. A rotary mixing and close-off valve 85 is also provided.

Modification of the FIG. 5 embodiment by the blocking off of bleed passages 86,87 and the substitution of the spool of FIG. 6 in the modified valve body of FIG. 5 provides the benefits of the present invention. The spool 88 of FIG. 6 includes O-ring seals 89 to isolate the inward-facing annular surfaces of the heads 81,82, while interconnection for fluid transfer between the enclosed associated chambers 91,93 is provided by the balance passage 55 and cross bores 90 in the valve spool 88. The communicating bleed passages 83,84 are retained of necessity, to provide the requisite spool actuating force, by the communication of valve secondary pressures to the outer faces of heads 81,82 in spool positioning relation thereagainst.

The FIG. 7 prior art embodiment of the above identified Assmann valve 95 shows the provision of a spool 94 having a central piston 97 connected by bleed passages 98 with the respective valve outlets, and including centering springs 99. In addition, bleed reliefs 101 on the outlet or secondary side of spool 96 admit regulated fluid at output or secondary pressure to opposing end chambers 103.

By substituting the FIG. 8 spool 105 for the Assmann spool 96, the present invention is implemented. Thus O-ring seals 89 at the spool ends serve to isolate the end chambers 103 from both the primary and secondary fluid pressures acting in the valve. The through bore 107 of the spool 105 connects the end chambers 103 in free fluid transfer relation, so that the spool is not restrained against being positioned under secondary pressure forces exerted against the central piston 97, as in the original, and the centering forces of the springs 99.

In all of the illustrated embodiments it can be seen that in accordance with the invention the possibility of passage of foreign matter from the regulated fluid into restricted chambers of the respective valves is significantly reduced, while the adverse effects of seal failure, is greatly reduced, due to the pressure balancing effect always provided by the pressure equalizing flow transfer passage extending through the respective spools.

The possibility of liming up of the spool bores with consequent interference in spool positioning under desired balancing forces is correspondingly reduced.

Turning to FIGS. 3 and 4, embodiments for a discussion of the effects of seal failure, in the prior art FIG. 3, failure of the left hand O-ring seal of spool 70 could admit fluid to the end space 72 at some function of primary or inlet pressure. This pressure would probably not be totally effective, due to bleed-out through aperture 76. However, the aperture 76 is initially limited, and the build up of primary fluid leakage therethrough will lead to the generation of unbalanced force acting in repositioning relation on the spool 70. In the case of the FIG. 4 embodiment according to the present invention, the failure of one of the O-ring end seals will admit pressurized fluid at primary or secondary pressure to the end chambers 73'. The through bore 55 will transfer this pressure to the opposing end chamber 73', and the spool 70' will be substantially unaffected.

What I claim by Letters Patent in the United States is:

1. In a pressure compensating valve having a valve body, a pair of fluid inlets to receive first and second pressurized fluids therein, a pair of fluid outlets each connected in fluid receiving relation with a respective one of said inlets, to discharge said fluids, a spool member mounted in said body in axial sliding relation therein, diaphragm means connected to said spool member being positioned within said body adjacent said outlets to separate said first and second fluids and moveable thereby to regulate the passage of said fluids between said inlets and said outlets in pressure balanced relation, a pair of spaced apart chambers in said valve body receiving respective portions of said spool member in fluid sealing relation therein, the improvement comprising substantially unrestricted passage means extending through the spool and exclusively interconnecting said chambers to permit free transfer of fluid therebetween on axial displacement of the spool member responsive to movement of said diaphragm means in the valve body.

2. A pressure compensating mixing valve having a spool member mounted in axial sliding relation within a valve body, said valve having annular diaphragm means connected in sealing relation with the spool and dividing the valve body to isolate from each other two working fluids within the body, being responsive in operation to changes in pressure balance of said fluids to reposition said spool in flow compensating relation therewith, mutually oppositely located chamber means to receive spaced apart portions of the spool member therein, seal means within said chamber means in sealing relation with end portions of the spool to preclude leakage between the spool end portions and the walls of the chamber means, and passage means extending generally axially through said spool member exclusively interconnecting said chamber means in pressure equalizing relation therebetween on axial displacement of the spool member within the valve.

* * * * *